United States Patent

Youmans

[15] 3,688,114
[45] Aug. 29, 1972

[54] DUAL PURPOSE RADIOACTIVITY WELL LOGGING DETECTOR SYSTEM

[72] Inventor: Arthur H. Youmans, Houston, Tex.

[73] Assignee: Dresser Industries, Inc., Dallas, Tex.

[22] Filed: July 13, 1970

[21] Appl. No.: 54,267

[52] U.S. Cl. ........250/71.5 R, 250/83.1, 250/83.6 W, 250/105, 250/108 R
[51] Int. Cl. .............................G01t 1/20, G21f 1/00
[58] Field of Search .......... 250/71.5 R, 83.1, 83.3 R, 250/83.6 W, 105, 108 R

[56] References Cited

UNITED STATES PATENTS

| | | |
|---|---|---|
| 3,183,358 | 5/1965 | Cooley ............ 250/83.6 W X |
| 3,120,612 | 2/1964 | Youmans ......... 250/83.6 W X |
| 3,510,655 | 5/1970 | Givens ............ 250/83.6 W X |
| 3,484,609 | 12/1969 | Pritchett et al. ...... 250/71.5 R |

*Primary Examiner*—Archie R. Borchelt
*Attorney*—Robert W. Mayer, Thomas P. Hubbard, Jr., Daniel Rubin, Raymont T. Majesko, Roy L. Van Winkle, William E. Johnson, Jr. and Eddie E. Scott

[57] ABSTRACT

A well logging system that utilizes a determination of the lifetime of neutrons in the formations surrounding a well bore includes a dual purpose detector. The detector system includes a movable shield positioned to exclude neutron radiation from a CsI crystal. Means are provided to displace the shield and the system is synchronized with a recorder.

13 Claims, 5 Drawing Figures

INVENTOR
ARTHUR H. YOUMANS
*Eddie E. Scott*
ATTORNEY

INVENTOR
ARTHUR H. YOUMANS

Eddie E. Scott
ATTORNEY

DUAL PURPOSE RADIOACTIVITY WELL LOGGING DETECTOR SYSTEM

BACKGROUND OF THE INVENTION

This invention relates to the art of radioactivity well logging and more particularly relates to a system for neutron well logging based on the lifetime of neutrons in the formations. A system for performing this type of well logging includes a pulsed neutron source and a gated detector mounted in a housing adapted to traverse a well bore.

The neutron source generates discrete pulses of neutrons that are directed into the formations surrounding the well bore. The gated detector detects radiation from the formations surrounding the well bore during two separate intervals. The information received is used to indicate the decline of neutrons in the formations. Detectors used in this type of logging system have been either a neutron detector or a gamma ray detector. Gamma ray detectors have generally been preferred because detection of gamma rays generally produces a neutron lifetime measurement which has less undesirable influence due to borehole effects and which samples the formation with a greater radius of investigation. However, there are certain merits to using a neutron detector, in particular such a measurement is not affected by induced radioactivity in the oxygen contained in water and rocks surrounding the neutron source. The use of both a neutron detector and a gamma ray detector in the same instrument has been proposed but there are a number of problems inherent in attempting to provide such an instrument. Moreover, it is desirable to employ both detectors at the same distance from the neutron source so that the two measurements will differ only as to the type of detected radiation. Obviously, two different detectors cannot be placed at the same spot in the instrument.

DESCRIPTION OF THE PRIOR ART

A description of a well logging system based on the lifetime of neutrons in the formations is provided in U.S. Pat. No. 3,379,882 to A. H. Youmans, patented Apr. 23, 1968. The formations are irradiated with neutrons from a periodically varying source operating at a frequency in the order of magnitude of 2,500 cycles per second, being thus alternately on and off for periods of 200 microseconds. A detector system is synchronized with the source to operate while the source is off. This patent indicates that the radiation detected may be either neutrons or gamma rays which result from thermal neutron capture; in either case, the signal is related to the population of thermal neutrons. The formations surrounding the well are irradiated with bursts of high energy neutrons to develop a population of neutrons therein. The rate at which neutrons decline away is determined by detecting radiation emanating from the formations during at least two separate intervals.

In U.S. Pat. No. 3,379,884 to A. H. Youmans, patented Apr. 23, 1968, and entitled "Method and Apparatus for Neutron Lifetime Well Logging"; a source for generating periodic bursts of neutrons is shown. The source comprises a material emitting alpha particles with a disc rotating beside it having alternate sections of materials that emit neutrons when exposed to the alpha particles. The disc is rotated to turn the neutron source on and off at an audio frequency.

As previously explained, this type of logging system requires a detector that will detect radiations from the formations surrounding the well during two or more discrete intervals following irradiation of the formations. An example of such a detector is shown in U.S. Pat. No. 3,254,218 to E. C. Hopkinson, patented May 31, 1966.

The logging instruments of the prior art include either a neutron detector or a gamma ray detector. Consequently, when it is necessary to obtain logs with both of these detectors, two instruments are required. This, of course, is undesirable and requires that the first instrument be withdrawn from the well bore and the second instrument substituted. Although the use of two separate detectors in the same instrument has been proposed, it has not yet been shown to be successful.

SUMMARY OF THE INVENTION

The present invention provides a system for neutron lifetime well logging employing a radiation detector that may be either a neutron detector or a gamma ray detector. The subsurface instrument housing contains a pulsed neutron source and the dual purpose detector. A movable shield is positioned substantially around the detector to exclude neutrons thereby providing a detector that detects gamma rays only. The subsurface instrument is lowered into a well bore with the shield in one position and a portion of the well logged. The shield is then moved to the other position and the same portion of the well logged again.

In another embodiment of the present invention, the shield consists of two separate cooperating shields, one stationary and the other movable. In addition to logging as explained above, the shield may be moved from the full shielding position to the half shielding position periodically as the instrument traverses a portion of the well. The system is synchronized to separately record the radiation corresponding to the respective shielded positions. The shield may also consist of a series of plates positioned around the detector with at least some of the plates being movable thereby forming a shutter.

It is therefore an object of the present invention to provide a system for Neutron Lifetime Logging including both a neutron detector and gamma ray detector in a single subsurface instrument.

It is a further object of the present invention to provide a well logging system capable of logging a portion of a borehole utilizing both a neutron detector and a gamma ray detector without requiring two runs.

It is a still further object of the present invention to provide a dual purpose detector.

It is a still further object of the present invention to provide a well logging system that will produce a log relatively free from borehole effects.

It is a still further object of the present invention to provide a well logging system that will sense varying borehole conditions.

It is a still further object of the present invention to provide a logging system that may be used to correct other logs.

The above and other objects and advantages will become apparent from a consideration of the following detailed description when taken in conjunction with the drawing.

DETAILED DESCRIPTION OF THE INVENTION

Figures 1, 2:
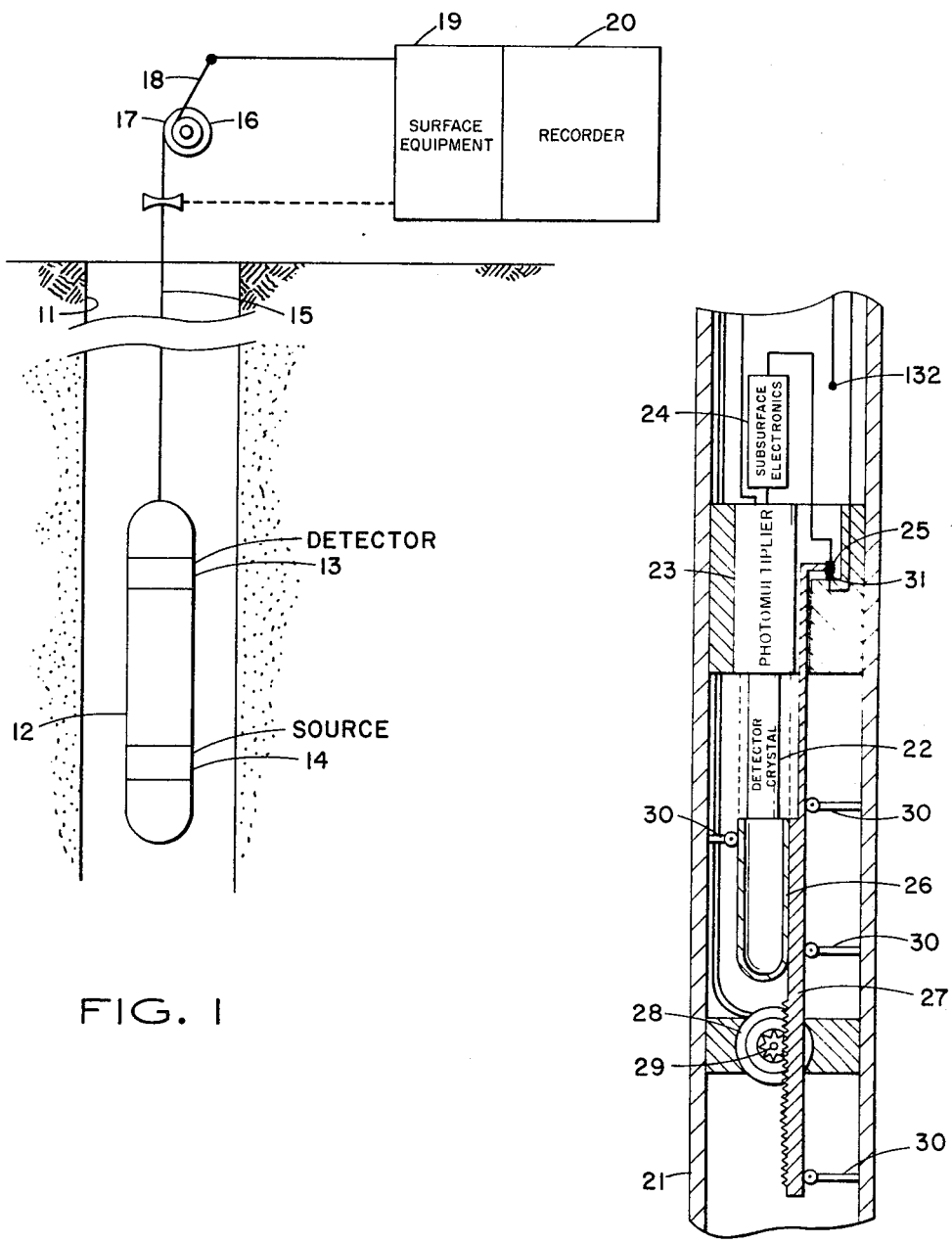
FIG. 1 is a diagrammatic illustration of a radioactivity well logging system of the present invention.
FIG. 2 illustrates a subsurface instrument of the well logging system of the present invention.

Referring now to FIG. 1, there is illustrated schematically a radioactivity well logging system of the present invention for neutron well logging based on the lifetime of neutrons in the formations. A well 11 penetrates the earth's surface and may or may not be cased. Disposed within the well is a subsurface instrument 12 of the well logging system. Subsurface instrument 12 contains a detecting system 13 and a pulsed neutron source 14. Cable 15 suspends the instrument in the well and contains the required conductors for electrically connecting the instrument with the surface equipment. The cable 15 is wound on or unwound from drum 16 in raising and lowering the instrument 12 to traverse the well.

Instrument 12 traverses the well 11 in making a radioactivity log. Discrete pulses of neutrons from source 14 irradiate the formations surrounding the well and the radiations emanating from the formations are detected by detecting system 13. The signal from detector 13 is sent to the surface along cable 15. By means of slip rings 17 and brushes 18 on the end of drum 16, the signal is conducted to the surface equipment 19 and recorded by recorder 20. Recorder 20 is driven through a transmission by a measuring reel over which cable 15 is drawn so that recorder 20 moves in correlation with depth as the instrument 12 traverses the well. The elements are shown diagrammatically and it is to be understood that the associated circuits and power supplies are provided in the conventional manner. It is also to be understood that the instrument housing will be constructed to withstand the pressures and mechanical and thermal abuses encountered in logging a deep well and to provide adequate space within it to house the necessary apparatus and permit the transmission of radiation through it.

Referring now to FIG. 2, a cut-away view of a subsurface instrument housing 21 is shown wherein a detector of the present invention is mounted. A detector crystal 22 is positioned in the subsurface instrument 21. The detector crystal 22 consists of a CsI(Na) crystal because cesium has a high thermal neutron capture cross section in the order of 31 barns and is a very efficient neutron absorber. Neutron capture in the crystal results in gamma emission from the capturing nucleus which gamma photons are in turn likely to be detected by detection of the scintillations they produce if they are absorbed. Thus, the CsI(Na) crystal is in effect a neutron detector as well as a gamma ray detector. A photomultiplier tube 23 is mounted above the detector crystal and firmly connected to the instrument housing 21. The signal from photomultiplier tube 23 is conducted to the subsurface electronics section 24 and then transmitted through a movable contact 25 to the surface. Movable contact 25 will be explained in greater detail subsequently. The subsurface electronics section 24 includes the conventional electronics used in radioactivity well logging, such as an amplifier, discriminator and cable driver. It can be appreciated that the signal representing gamma radiation plus neutron radiation in transmitted to the surface through the logging cable wherein it is recorded.

In order to convert the detector into a pure gamma ray detector, a movable shield 26 is provided that may be moved into position substantially surrounding the detector crystal 22. The movable shield 26 restricts neutrons from reaching detector crystal 22 and thereby provides a detector that detects gamma rays only. The movable shield 26 may be a hollow cylindrical element containing a substantial proportion of the element boron preferably enriched in the isotope of mass 10 or of the element lithium preferably enriched in the isotope of mass 6. Shield 26 is adapted to be moved into a position substantially surrounding the detector crystal 22. A rock 27 is firmly attached to the movable shield 26 and includes a portion having a series of teeth extending therefrom. A motor 28 is securely mounted in subsurface instrument housing 21 and a gear 29 mounted on the drive shaft. The gear 29 engages the tooth portion of rack 27. When motor 28 is energized, gear 29 will cause the rack 27 to move upward, thus moving the shield 26 into a position substantially surrounding detector crystal 22. By reversing the gear drive, shield 26 may again be lowered so that it is no longer surrounding detector crystal 22. Suitable means such as a series of rollers 30 are provided to stabilize the rack and shield. A movable contact 25 is attached to the upper end of rack 27. Thus, when the shield 26 is in the lowered position, the movable contact 25 is in communication with a stationary contact 31 thereby completing a circuit to the surface equipment. When the shield 26 is in the up position surrounding the detector crystal 22, the movable contact 25 will be in contact with a stationary contact 132 thus forming a second circuit with the surface equipment.

The operation of the detector of the present invention will now be summarized. The subsurface instrument housing 21 is lowered into the well bore. Motor 28 is energized and the shield 26 lowered into the nonshielding position. The movable contact 25 is in communication with stationary contact 31. The instrument housing 21 is moved along a portion of the well bore. A Neutron Lifetime Log is made of that portion of the borehole. With the shield 26 in the lowered position, the detector crystal 22 will be receiving both gamma radiation and neutron radiation. The movable contact 25 is electrically connected to contact 31 and the logging signal detected is transmitted to the surface equipment where it may be recorded. Motor 28 is energized and rack 27 driven upward thereby placing shield 26 in a position surrounding detector crystal 22. The same portion of the borehole is again logged with the detector acting as a pure gamma ray detector. The movable contact 25 has been moved upward and is electrically connected to stationary contact 132 thus allowing a separate log to be recorded with shield 26 in the up position.

Figure 3:
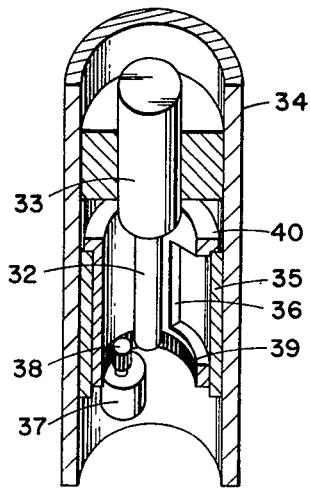
FIG. 3 is another embodiment of the present invention.

Referring now to FIG. 3, another embodiment of the present invention is shown. A CsI(Na) detector crystal 32 and photomultiplier tube 33 are positioned in a subsurface instrument housing 34. A stationary shield 35 is affixed to the housing 34. The stationary shield 35 forms one-half of a hollow cylindrical shield and a movable shield 36 forms the other half. An electric motor 37 is positioned below the shield and a gear 38 is connected to the drive shaft of the motor. The gear 38 engages a gear element 39 attached to the lower portion of movable shield 36. The gear element 39 is circular thereby allowing the motor 37 to run in one direction and drive the movable shield 36 from the half shielding position to the full shielding position. The upper portion 40 of movable shield 36 is circular and includes a portion that extends over stationary shield 35 thus providing support for the entire structure. It is to be understood that suitable bearing means may be provided to facilitate movement of the movable shield 36 and that the associated electrical circuits and power supplies are provided in a conventional manner.

The subsurface instrument housing 34 is lowered into a well bore and a portion of the well bore may be logged in a manner similar to that explained in connection with the embodiment shown in FIG. 2. The portion of the well bore is logged with the movable shield in a first position, said first position may be either the half shielded position of a fully shielded position. The electric motor 37 is then energized and movable shield 36 driven one-half revolution to place the shield in the second position. The same portion of the borehole is again logged.

The motor 37 may also be allowed to run continuously as housing 34 is moved along the well bore. Movable shield 36 will then move alternately from the one-half shielded position to the fully shielded position. The system is synchronized to separately record the radiation corresponding to the respective shielded positions.

Figure 4:
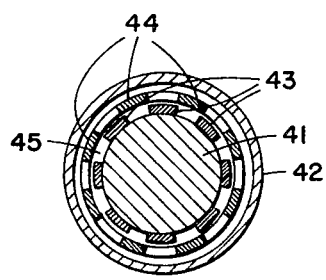
FIG. 4 is another embodiment of the present invention.

Referring now to FIG. 4, a cut-away top view of another embodiment of a radioactivity well logging system of the present invention is shown. A CsI(Na) detector crystal 41 is mounted in a subsurface instrument housing 42. A series of plates 43 containing a substantial proportion of the element boron preferably enriched in the isotope of mass 10 or of the element lithium preferably enriched in the isotope of mass 6 are spaced around the outer circumference of the detector crystal 41. A second series of the same type of plates 44 are mounted on a circular element 45 and adapted to cooperate with the series of plates 43 to form a shield around the detector crystal 41. The circular element 45 is rotatably mounted in housing 41 and connected to a motor means (not shown) to provide rotation. In effect, the two series of plates 43 and 44 form a shutter that may either admit neutron radiation or exclude it.

The operation of this embodiment of the invention will now be summarized. The instrument housing 41 is lowered into a well bore. The pulsed neutron source (not shown) directs discrete pulses of neutrons into the formations surrounding the well bore. The detector detects radiation during at least two discrete intervals to provide an indication of the decline of neutrons in the formations surrounding the well bore. When in the fully shielded position, the shield excludes neutrons from detector crystal 41 thereby causing the detector to act as a pure gamma detector. When the rotatable element 45 has moved a distance to place the series of plates 44 in the partial shielding position, neutrons are admitted to the detector crystal 41 and the detector acts as a gamma ray plus neutron detector. The recording system in the surface equipment (not shown) is synchronized with the movable shield so that when the shield is in fully shielding position, a first log is recorded and when the shield is in partially shielding position, a second log is recorded.

Figure 5:
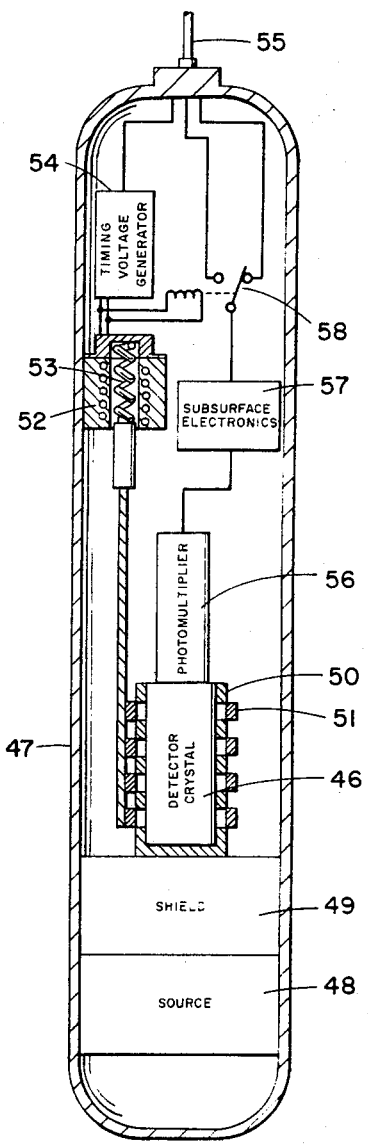
FIG. 5 is yet another embodiment of the present invention.

Referring now to FIG. 5, an embodiment of this invention is shown wherein the detector may be actuated by a reciprocating device such as a cam or solenoid. A CsI(Na) detector crystal 46 is mounted in a subsurface instrument housing 47. Also positioned in the subsurface instrument housing 47. Also positioned in the subsurface instrument housing 47 is a pulsed neutron source 48 and a shield 49 positioned between detector crystal 46 and source 48.

A movable shield consisting of two cooperating shields 50 and 51 surrounds the detector crystal 46. The two cooperating shields 50 and 51 consist of circumferential cylindrical rings containing a substantial proportion of the element boron preferably enriched in the isotope of mass 10 or of the element lithium preferably enriched in the isotope of mass 6. The rings are positioned on closely fitting coaxial cylindrical mandrels. In the position shown, the shielding of neutrons is complete and the detector operates as a pure gamma ray detector. When the solenoid 52 is actuated, the outer array of shielding rings 51 is moved to a position such that the rings on the outer and inner mandrel fall at the same longitudinal position, allowing neutrons to pass through the gaps between the rings. The solenoid 52 acts against a spring 53 so that the shield will return to its first position when not supplied with actuating power. The solenoid 52 may be actuated to move the shield from one position to the other as the tool moves through the well bore.

The detecting system may be synchronized with tool movement and the surface recording equipment by periodically energizing the solenoid 52 in synchronism with the surface equipment. This may be accomplished by timing voltage generator 54 that periodically energizes and deenergizes the solenoid 52. Synchronism might also be accomplished by other means such as employing a shaft encoder driven by the cable sheave such that an electrical pulse is produced for every half foot of movement of the logging cable 55. The encoder pulses could then actuate a circuit which would alternately move the shield into its "full shielded" and "half shielded" positions.

The signal from the photomultiplier 56 is conducted to the subsurface electronics section 57 which includes conventional electronics used in radioactivity well logging such as an amplifier, discriminator and cable driver. The signal is then transmitted to the surface by one of two circuits depending upon the position of relay 58. When the solenoid 52 is energized, the relay 58 will be actuated thereby changing the contacts from one circuit to the other. It can be appreciated that this will allow the radiation signal to be switched alternately from one cable conductor to another. The respective conductors are connected to the surface equipment and recording means (not shown) for separately recording the two curves corresponding respectively to a "fully shielded" and "half shielded" detector. It will also be appreciated that instead of separate cable conductors the two channels of information may be sent over a single conductor by telemetry means well known in the art.

The embodiments of the invention in which an exclusive property or privilege is claimed are defined as follows:

1. A radioactivity well logging system for investigating the formations surrounding a well bore by detecting the decline of neutrons in the formations, comprising:
   a housing adapted to be lowered into the well bore;
   source means in said housing for directing pulses of neutrons into the formations surrounding the well bore; and
   detector means in said housing for detecting the decline of neutrons in the formations by selectively detecting either gamma radiation or neutron radiation emanating from the formations, said detector means including;
   shield means for excluding neutron radiation from said detector means and means for moving said shield means so that it does not exclude said neutron radiation from said detector means.

2. The radioactivity well logging system of claim 1 wherein said shield means includes a substantial proportion of boron 10.

3. The radioactivity well logging system of claim 1 wherein said shield means includes a substantial proportion of lithium 6.

4. The radioactivity well logging system of claim 1 wherein said detector means includes a CsI crystal.

5. The radioactivity well logging system of claim 1 wherein said shield means includes a hollow cylindrical element positioned around said detector means.

6. The radioactivity well logging system of claim 1 wherein said shield means includes a series of plates positioned around said detector means, at least some of said plates being movable thereby forming a shutter.

7. The radioactivity well logging system of claim 1 including recording means for producing a record related to the radiation detected by said detector means.

8. The well logging system of claim 7 including means for synchronizing the recording means, detector means and means for moving said shield means thereby providing at least two separate records related to the radiation detected.

9. A radioactivity well logging system for investigating the formation surrounding a well bore by detecting the decline of neutrons in the formations, comprising:
   a housing adapted to be lowered into the well bore;
   source means in said housing for directing pulses of neutrons into the formations surrounding the well bore;
   detector means including a cesium iodide crystal in said housing for detecting the decline of neutrons in the formations by detecting radiation emanating from the formations, said detected radiation consisting of gamma radiation and neutron radiation;
   shield means for excluding the neutron radiation from said detector means; and
   means for moving said shield means so that it does not exclude the neutron radiation from said detector means.

10. The radioactivity well logging system of claim 9 wherein said shield means includes a hollow cylindrical shield element containing a substantial proportion of boron 10, positioned around said detector means.

11. The radioactivity well logging system of claim 9 wherein said shield means includes a series of elements positioned to enclose said detector means, said elements containing a substantial proportion of boron 10, with at least some of said elements being movable thereby forming a shutter.

12. The well logging system of claim 11 including recording means for producing a record relating to the radiation detected by said detector means.

13. The well logging system of claim 12 including means for synchronizing the recording means, detector means and means for moving said shield means thereby providing separate records related to the gamma radiation detected and the neutron radiation detected.

* * * * *